United States Patent
Achenbach et al.

Patent Number: 5,936,054
Date of Patent: Aug. 10, 1999

[54] ADDITION-CROSSLINKED SILICONE ELASTOMERS WITH REDUCED COMPRESSION SET

[75] Inventors: Frank Achenbach, Simbach/Inn; Christof Wörner, Burghausen; Brigitte Ostermeier, Erlbach; Georg Eberl; Jelica Gegic, both of Burghausen, all of Germany

[73] Assignee: Wacker-Chemie GmbH, Munich, Germany

[21] Appl. No.: 08/872,581

[22] Filed: Jun. 10, 1997

[30] Foreign Application Priority Data

Aug. 1, 1996 [DE] Germany .......................... 196 31 129

[51] Int. Cl.$^6$ .................................................. C08G 77/06
[52] U.S. Cl. .............................. 528/21; 524/94; 524/715; 528/15
[58] Field of Search .................... 528/15, 21; 524/94, 524/715

[56] References Cited

U.S. PATENT DOCUMENTS

5,073,583  12/1991  Broderick.
5,104,919   4/1992  Okami et al. .............................. 524/94
5,447,661   9/1995  Takahashi et al. ...................... 252/511

FOREIGN PATENT DOCUMENTS

0388201   9/1990  European Pat. Off..
0517524  12/1992  European Pat. Off..
0620248  10/1994  European Pat. Off..

*Primary Examiner*—Melvyn I. Marquis
*Assistant Examiner*—Mark W. Milstead
*Attorney, Agent, or Firm*—Brooks & Kushman P.C.

[57] ABSTRACT

An addition-crosslinkable silicone rubber composition comprising the constituents (I) an alkenyl-functional polyorganosiloxane
(II) a SiH-functional crosslinker
(III) a hydrosilylation catalyst and
(IV) at least one 1H-benzotriazole-5-carboxylic acid derivative selected from a group consisting of 1H-benzotriazole-5-carboxylic acid esters and 1H-benzotriazole-5-carboxylic acid amides.

7 Claims, No Drawings

ADDITION-CROSSLINKED SILICONE ELASTOMERS WITH REDUCED COMPRESSION SET

BRIEF SUMMARY OF THE INVENTION

The present invention relates to addition-crosslinkable silicone rubber compositions which include esters and/or amides of 1H-benzotriazole-5-carboxylic acid, and to shaped articles with low compression set which can be produced by crosslinking of the silicone rubber compositions.

BACKGROUND OF THE INVENTION

In many applications of addition-crosslinked silicone elastomers, it is important that the silicone elastomer does not deform permanently under pressure. For example, the performance of a gasket would be reduced or nullified if it exhibited plastic behavior under compression, since as plastic deformation increased there would be a reduction in the stress which arises as a result of compression of the elastomer and which ensures effective sealing. Silicone elastomers which are used in applications of this type should therefore have the smallest possible plastic component in their deformation behavior under compression. This property of a material can be quantified using the compression set according to DIN 53 517, so that different materials can be compared with one another. The compression set is determined by measuring the thickness of a cylindrical test specimen before and after a continuous compression of 25% at 175° C. for 22 h. If there is complete recovery, the thickness of the test specimen being identical before and after the application of the load, the compression set is 0%; if, in contrast, the 25% compression applied during the test remains unchanged when the load is removed, the compression set is 100%.

Addition-crosslinked silicone elastomers typically have a compression set of up to 70%. In order to reduce this, it is usual to subject silicone elastomers to post curing after the crosslinking reaction. The posting is a subsequent thermal after treatment of the silicone elastomer comprising, for example, holding for 4 h at 200° C. in a stream of fresh air. Although very low compression sets can be achieved by post-curing, it is a time-consuming and energy-intensive additional process step which it is desirable to avoid. It is of particular interest to develop silicone rubber compositions having very low compression sets immediately after crosslinking so that it becomes unnecessary to post-cure the moldings which are produced.

EP-A-517 524 and EP-A-388 201 describe the use of different triazole and benzotriazole derivatives as additives for the controlled reduction of the compression set of addition-crosslink silicone elastomers. In each of the examples, only 1H-benzotriazole, which is identified as preferred, is used. The trizole and benzobiazole derivatives listed in these disclosures are insoluble in addition-crosslinke silicone rubber compositions, i.e. their homogeneous incorporation is difficult. The inhomogeneous distribution of the triazole and benzotriazole derivatives in the silicone rubber composition makes it impossible to control the compression set reproducibly to low values. The insolubility of the triazole and benzotriazole derivatives particularly depresses their effectiveness in reducing the compression set. Furthermore, a local excess concentration of triazole and benzotriazole derivative can give rise to incomplete crosslinking. These disadvantages are more clearly evident if, the silicone rubber composition which includes triazole or benzotriazole is stored for some time before crosslinking, because coarsening and separation of the triazole and/or benzotriazole compound increasingly takes place.

The insolubility of the triazole and benzotriazole derivatives impairs the transparency of the silicone elastomer because of clouding and streaking from the microystarites which form. Homogeneous distribution of the triazole and benzotriazole derivatives is also not achievable by incorporation assisted by an organic solvent, as described in EP-A-388 201; rather, this has the result that either an unacceptable amount of the solvent remains in the silicone rubber composition or the triazole or benzotriazole compound reprecipitates after the solvent is removed.

The introduction of a large amount of triazole or benzotriazole compound in order to ensure adequate concentration throughout the silicone rubber composition is also unsuccessful, since excessive proportions impair crosslinking. Depending on the specific formulation of the addition-cross-linking silicone rubber composition, the triazole or benzotriazole compounds exhibit considerable differences in effectiveness.

The object of the present invention is to provide an additive which may be added to the uncrosslinked rubber composition and which brings about a low compression set of the unpost-cured silicone elastomer, without having the disadvantages of the known additives.

The invention relates to addition-crosslinkable silicone rubber compositions comprising as constituents (I) alkenyl-functional polyorganosiloxane
(II) SiH-functional crosslinker
(III) hydrosilylation catalyst and
(IV) esters and/or amides of 1H-benzotriazole-5-carboxylic acid.

The addition-crosslinkable silicone rubber compositions include, for reduction of their compression set, esters and/or amides of 1H-benzotriazole-5-carboxylic acid. The esters and/or amides of 1H-benzotriazole-5-carboxylic acid used are very soluble in the uncrosslinked silicone rubber composition and do not impair the transparency of the resulting silicone elastomer. The solubility of the esters and/or amides of 1H-benzotriazole-5-carboxylic acid removes the necessity for assistance of a solvent when they are incorporated into the silicone rubber composition. The effectiveness of the esters and/or amides of 1H-benzotriazole-5carboxylic acid in reducing the compression set remains unchanged on storage of the silicone rubber composition; the crosslinking behavior is not impaired. The esters and/or amides of 1H-benzotriazole-5-carboxylic acid are also colorless. Furthermore, the silicone elastomers which include small amounts of esters and/or amides of 1H-benzotriazol-5-carboxylic acid have extremely low values for compression set immediately following the crosslinking reaction, so that any subsequent post-curing is completely unnecessary. The completeness, and the rate, of cross-linking of the silicone rubber composition are not adversely affected even at relatively high inclusions of esters and/or amides of 1H-benzotriazole-5-carboxylic acid. The mechanical properties of the silicone elastomers, such as hardness, tear strength and elongation at break, remain likewise unchanged. Very low compression set values are always achieved, independently of the specific formulation of the addition-crosslinking silicone rubber composition.

Constituent (I) of the novel silicone rubber composition is a polyganosiloxane which contains at least two alkenyl groups per molecule and which has a viscosity at 25° C. in the range from 0.1 to 500,000 Pa·s, preferably from 1 to 100 Pa·s.

The formulation of the alkenyl-containing polyorganosiloxane (I) has the average formula

in which
- R is an identical or different monovalent $C_1$–$C_{10}$-hydrocarbon radical containing aliphatic carbon-carbon multiple bonds and which is bonded to silicon, optionally via a bifunctional organic group, and which are optionally halo- or cyano-substituted,
- $R^1$ is an identical or different monovalent SiC-bonded $C_1$–$C_{10}$-hydrocarbon radical which have no aliphatic carbon-carbon multiple bonds and is optionally halo- or cyano-substituted,
- a is a non-negative number such that at least two radicals $R^1$ are present in every molecule, and
- b is a non-negative number such that (a+b) is in the range from 1.8 to 2.5.

The alkenyl groups R are available for an addition reaction with an SiH-functional crosslinker. Use is usually made of alkenyl groups with from 2 to 6 carbon atoms, such as vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

Bivalent organic groups via which the alkenyl groups may be bonded to silicon of the polymer chain consist, for example, of oxyalkylene units, such as those of the formula

in which
- c has the value 0 or 1, preferably 0,
- d has values from 1 to 4, preferably 1 or 2 and
- e has values from 1 to 20, preferably from 1 to 5.

The oxyalkylene units of formula (2) are bonded on the left hand side to a silicon atom.

The radicals R may be bonded at any position in the polymer chain, in particular at the terminal silicon atoms.

Examples of $R^1$ are alkyl groups, such as methyl, ethyl, propyl, butyl and hexyl, aryl and alkaryl groups, such as phenyl, tolyl, xylyl, mesityl, benzyl, β-phenylethyl and naphthyl, or substituted groups, such as 3,3,3-trifluoropropyl, o-, p- and m-chlorophenyl, bromotolyl and β-cyanoethyl. Preferred substituents are fluorine, chlorine and bromine. $R^1$ has preferably from 1 to 6 carbon atoms. Methyl and phenyl are preferred.

Constituent (I) may also be a mixture of different alkenyl-containing polyorganosiloxanes which differ, for example, in their alkenyl group content, in the type of alkenyl group, or structurally.

The structure of the alkenyl-containing polyorganosiloxanes may be linear, cyclic or branched. Branched polyorganosiloxanes contain, besides monofunctional units, such as $RR^1_2SiO_{1/2}$ and $R^1_3SiO_{1/2}$, and bifunctional units, such as $R^1_2SiO_{2/2}$ and $RR^1SiO_{2/2}$, also trifunctional units such as $RSiO_{3/2}$ and $R^1SiO_{3/2}$, and/or tetrafunctional units of the formula $SiO_{4/2}$. The included amount of these tri- and/or tetrafunctional units which lead to branched polyorganosiloxanes is typically very small, in fact preferably at most 20 mol %, in particular at most 0.1 mol %. The alkenyl-containing polyorganosiloxane (I) may also contain units of the formula

where
- $R^2$ and $R^3$ are as defined above for R and $R^1$ and
- $R^5$ is a bivalent organic radical, such as ethylene, propylene, phenylene or biphenylene or a radical of formula (2).

Units of formula (3) may be present in (I) at a proportion of up to 50 mol %. Preference is given to polydimethylsiloxanes which contain vinyl groups and whose molecules correspond to the formula

where the non-negative integers f and g satisfy the following relationships:

$f+1>0,50<(f+g)<20000$, preferably $200<(f+g)<1000$, and $0<(f+g)<0.2$

Constituent (II) of the novel silicone rubber composition is an SiH-functional crossliner which corresponds to the formula

in which
- $R^6$ is as defined for $R^1$ above and
- h and i are non-negative integers, with the proviso that $0.5<(h+i)<3.0$ and
- $0<h<2$, so that at least two hydrogen atoms bonded to silicon are present in each molecule.

Preference is given to a crosslinker (II) which contains three or more SiH bonds per molecule. If a crosslinker which has only two SiH bonds per molecule is used, it is advisable to use an alkenyl-containing polyorganosiloxane (I) which has at least three alkenyl groups per molecule.

The hydrogen content of the crosslinker (II), which relates exclusively to the hydrogen atoms directly bonded to silicon atoms, is in the range from 0.002% to 1.7% by weight of hydrogen, preferably from 0.1% to 1.7% by weight of hydrogen.

The SiH-functional crosslinker (II) contains at least three and at most 600 silicon atoms per molecule. Preference is given to the use of SiH-crosslinkers (II) which contain between 4 and 200 silicon atoms per molecule.

The structure of the SiH-crosslinker (II) may be linear, branched, cyclic or network-like. Linear and cyclic SiH crosslinkers (II) are organosiloxanes whose molecules are composed of units of the formulae $HR^6_2SiO_{1/2}$, $R^6_3SiO_{1/2}$, $HR^6SiO_{2/2}$ and $R^6_2SiO_{2/2}$, where $R^6$ is as defined above. Branched and network-like SiH-crosslinkers (II) contain, in addition, trifunctional units of the formula $HSiO_{3/2}$ and/or $R^6SiO_{3/2}$ and/or tetrafunctional units of the formula $SiO_{4/2}$. As the content of tri- and/or tetrafunctional units increases, these crosslinkers (II) show a resin-like, network-like structure. The organic radicals $R^6$ in the SiH-crosslinker (II) are usually selected so that they are compatible with the radicals in the constituent (I), so that the constituents (I) and (II) are miscible.

Combinations and mixtures of the SiH-functional crosslinkers (II) described here may also be used as SiH-crosslinker (II).

Preferred SiH-crosslinkers are linear polyorganosiloxanes of the formula $$(HR^7{}_2SiO_{1/2})_j(R^7{}_3SiO_{1/2})_k(HR^7SiO_{2/2})_l(R^7{}_2SiO_{2/2})_m \qquad (7),$$

where $R^7$ are as defined for $R^1$ and the non-negative integers j, k, l and m satisfy the following relationships:

$(j+k)=2, (j+l)>2, 5<(l+m)<200$ and $1<l/(l+m)<0.1$.

The SiH-functional crosslinker is present in the crosslinkable silicone rubber composition in an amount giving a molar ratio of SiH groups to alkenyl groups of from 0.5 to 5, preferably from 1.0 to 3.0.

Constituent (III) serves as catalyst for the addition reaction, referred to as hydrosilylation, between the alkenyl groups of constituent (I) and the silicon-bonded hydrogen atoms of constituent (II). Numerous suitable hydrosilylation catalysts are described in the literature. In principle, use may be made of any hydrosilylation catalyst which is known from the prior art and which is used in addition-crosslinking silicone rubber compositions.

The hydrosilylation catalysts (III) may be metals and their compounds, such as platinum, rhodium, palladium, ruthenium or iridium, preferably platinum. The metals may, optionally be supported on fine-particle carrier materials, such as activated carbon, or metal oxides, such as alumina or silica.

Platinum and platinum compounds are preferred. Particular preference is given to platinum compounds which are soluble in polyorganosiloxanes. Soluble platinum compounds are, for example, the platinum-olefin complexes of the formulae $(PtCl_2 \cdot olefin)_2$ and $H(PtCl_3 \cdot olefin)$, where preference is given to alkenes having from 2 to 8 carbon atoms, such as ethylene, propylene and isomers of butene and octene, or cycloalkanes with from 5 to 7 carbon atoms, such as cyclopentene, cyclohexene and cycloheptene. Other soluble platinum catalysts are the platinum-cyclopropane complex of the formula $(PtCl_2C_3H_6)_2$, the reaction products of hexachloroplatinic acid with alcohols, ethers or aldehydes and/or mixtures of these, or the reaction product of hexachloroplatinic acid with methylvinylcyclotetrasiloxane in the presence of sodium bicarbonate in ethanolic solution. Preference is given to complexes of platinum with vinylsiloxanes, such as sym-divinyltetramethlydisiloxane.

The hydrosilylation catalyst (III) may also be used in microencapsulated form, where the fine-particle solid which contains the catalyst and is insoluble in the polyorganosiloxane is, for example, a thermoplastic, such as polyester resin or silicone resin. The hydrosilylation catalyst (III) may also be used in the form of an inclusion compound, for example in a cyclodextrin.

The amount of hydrosilylation catalyst (III) used depends on the desired rate of crosslinking and on cost factors. If common platinum catalysts are used, the content of platinum metal in the crosslinkable silicone rubber composition is preferably in the range from 0.1 to 500 ppm by weight, more preferably from 10 to 100 ppm by weight of platinum metal.

Constituent (IV) of the novel silicone rubber composition is an ester and/or amide of 1H-benzotriazole-5-carboxylic acid. The monovalent radical in the ester group improves the solubility of the ester and/or amide (IV) of 1H-benzotriazole-5-carboxylic acid in the silicone rubber composition. Preference is given to esters and/or amides (IV) of 1H-benzotriazole-5-carboxylic acid which have the formula

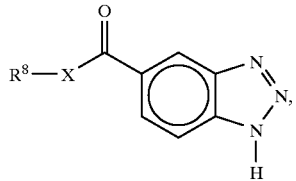

(8)

in which $R^8$ is a $C_2$–$C_{20}$-hydrocarbon radical which, optionally, may be halo- or cyano-substituted, or is an organosiloxane radical and X is a bivalent radical —O— or —$NR^{11-}$, where $R^{11}$ is H— or $R^8$.

Examples of hydrocarbon radicals $R^8$ are the examples of saturated and unsaturated aliphatic hydrocarbon radicals given above for R and $R^1$. Preferred substituents are fluorine, chlorine and bromine. Preference is given to saturated aliphatic hydrocarbon radicals. The hydrocarbon radicals $R^8$ contain from 3 to 15, preferably from 5 to 10, carbon atoms. Preferred radicals $R^8$ are alkyl radicals having from 5 to 10 carbon atoms.

The siloxane radicals $R^8$ may be oligo- or polyorganosiloxane radicals, containing hydrocarbon radicals which have from 1 to 12 carbon atoms and which may, optionally, be halo- or cyano-substituted. The siloxane radicals $R^8$ contain from 1 to 150, preferably from 2 to 50 silicon atoms.

The siloxane radicals $R^8$ consist to an extent of at least 50 mol %, preferably to an extent of at least 90 mol %, of units of the formula $R^9{}_2SiO_{2/2}$, where $R^9{}_3SiO_{1/2}$, $R^9SiO_{3/2}$ and $SiO_{4/2}$ units may also be present and $R^9$ is any unsubstituted or halo- or cyano-substituted hydrocarbon radical having from 1 to 12 carbon atoms. Preferred radicals $R^9$ are methyl and phenyl.

Examples of radicals $R^8$ are: —$SiMe_3$, —$SiMe_2$—O—$SiMe_3$, —$CH_2CH_2$—$SiMe_2$—O—$SiMe_2$—O—$SiMe_3$ and —$CH_2CH_2CH_2$—$SiMe_2$—$O(SiMe_2O)_n$—$SiMe_3$, where n has a value from 0 to 100, and Me is a methyl group.

Preference is given to octyl 1H-benzotriazole-5-carboxylate.

The content of ester and/or amide (IV) of 1H-benzotriazole-5-carboxylic acid in the novel silicone rubber composition is from 0.005% to 1.0% by weight, preferably from 0.01% to 0.1% by weight, more preferably from 0.02% to 0.05% by weight Mixtures of different esters and/or amides of 1H-benzotriazole-5-carboxylic acid may be used.

In order to achieve a sufficiently high mechanical strength of the silicone rubber, it is preferable to incorporate into the silicone rubber composition actively reinforcing fillers as constituent (V). Precipitated and pyrogenic silicas, and mixtures of these, are particularly useful as actively reinforcing fillers (V). The specific surface area of these actively reinforcing fillers should be at least 50 $m^2/g$, or preferably in the range from 100 to 400 $m^2/g$, as measured by the BET method. Actively reinforcing fillers of this type are well-known materials in the field of silicone rubbers.

The use of hydrophobic fillers (V) is advantageous, since these may simply be mixed directly into the constituent (II), whereas for the mixing of a hydrophilic filler a hydrophobicizing agent is necessary. Processes for preparing hydrophobic fillers, and the use of the latter in silicone rubbers, are known in the prior art.

The content of actively reinforcing filler (V) in the crosslinkable silicone rubber composition is in the range from 0% to 60% by weight, preferably from 10% to 40% by weight.

Optionally, the novel silicone rubber composition may comprise, as constituent (VI), other additives in a proportion of up to 70% by weight, preferably from 0.01% to 40% by weight These additives may be, for example, fillers, dispersion aids, adhesion promoters, inhibitors, pigments, dyes, plasticizers, thermal stabilizers, etc.

Examples of such additives are quartz powder, diatomaceous earth, clays, chalk, lithopones, carbon blacks, graphite, metal oxides, metal carbonates, metal sulfates, metal powders, fibers, dyes, pigments, etc. In particular, resin-like polyorganosiloxanes which essentially consist of units of the formulae $R^{10}SiO_{1/2}$, $R^{10}SiO_{3/2}$ and $SiO_{4/2}$, and optionally $R^{10}SiO_{2/2}$, where $R^{10}$ is as defined for $R^9$, in a proportion of up to 70% by weight, preferably up to 40% by weight, based on the entire silicone rubber composition, may be present. The molar ratio between monofunctional and tri- or tetrafunctional units in these silicone resins is preferably in the range from 0.5:1 to 1.5:1. Functional groups $R^{10}$, in particular alkenyl groups $R^{10}$, may also be present In particular, additives may be present which enable the pot life and the rate of crosslinking of the curable silicone rubber composition to be set to the desired value. These inhibitors and stabilizers are well-known in the field of addition-crosslinking compositions. Examples of common inhibitors are acetylenic alcohols, such as ethynylcyclohexanol and 2-methyl-3-butyn-2-ol, polymethylvinylcyclosiloxanes, such as methylvinylcyclotetrasiloxane, low-molecular-weight silicone oils with methylvinyl$SiO_{1/2}$ end groups, trialkyl cyanurates, alkyl maleates, such as diallyl maleate and dimethyl maleate, alkyl fumarates, such as diethyl fumarate and diallyl fumarate, organic hydroperoxides, such as cumin hydroperoxide, tert-butyl hydroperoxide and pinane hydroperoxide, organic peroxides, organic sulfoxides, organic amines and amides, phosphines and phosphites, nitriles, diaziridines and oximes.

The novel silicone rubber compositions are particularly suitable for producing dimensionally stable silicone-elastomer shaped articles which are subject to static and/or dynamic mechanical loading, such as gaskets and gasket materials, dampers, tubing and films; the invention likewise relates to these articles.

In the following examples, unless otherwise indicated, a) all amounts are based on weight;

b) all pressures are 0.10 MPa (abs.);

c) all temperatures are 20° C.

EXAMPLE 1

100 g of each of the two components of an addition-crosslinking polydimethylsiloxane liquid rubber composition (Elastosil® LR 3003/50 from Wacker-Chemie GmbH) are intimately mixed with respectively 0.02, 0.04, 0.1 and 0.2 g of octyl 1H-benzotriazole-5-carboxylate over a period of 5 minutes on a roll mill with roll temperature of 25° C. This mixture is then crosslinked in a hydraulic press at a temperature of 170° C. over a period of 5 minutes, giving a silicone-elastomer film. The demolded films, which have thicknesses of about 2 mm and 6 mm respectively, are not post-cured; they are characterized, without post-curing, with respect to compression set and other elastomeric properties.

COMPARATIVE EXAMPLE 2 (not according to the invention)

As described in Example 1, but with total exclusion of benzotriazole compound.

COMPARATIVE EXAMPLE 3 (not according to the invention)

As described in Example 1, however, in place of each of the amounts of octyl 1H-benzotriazole-5-carboxylate, the same amount of 1H-benzotriazole is used. Otherwise, the formulation of the silicone rubber composition, and the processing, remain unchanged.

COMPARATIVE EXAMPLE 4 (not according to the invention)

As described in Example 1, but in place of the octyl 1H-benzotriazo-5-carboxylate used in Example 1, 0.1 g of 1-methylbenzotliazoe is used. Otherwise, the formulation of the silicone rubber composition, and the processing, remain unchanged.

COMPARATIVE EXAMPLE 5 (not according to the invention)

As described in Example 1, but in place of the octyl 1H-benotriazol-5-carboxylate used in Example 1, 0.1 g of 1-hydroxybenzotzole is used. Otherwise, the formulation of the silicone rubber composition, and the processing, remain unchanged.

COMPARATIVE EXAMPLE 6 (not according to the invention)

As described in Example 1, but in place of the octyl 1H-benzotriazok-5-carboxylate used in Example 1, 0.1 g of 5-methylbenzotriazole is used. Otherwise, the formulation of the silicone rubber composition, and the processing, remain unchanged.

COMPARATIVE EXAMPLE 7 (not according to the invention)

As described in Example 1, but in place of the octyl 1H-benzotriazo-5-carboxylate used in Example 1, 0.04 g and 0.1 g respectively of 1H-1,2,3-triazole are used. Otherwise, the formulation of the silicone rubber composition, and the processing, remain unchanged.

COMPARATIVE EXAMPLE 8 (not according to the invention)

As described in Example 1, but in place of the octyl 1H-benzotriazole-5-carboxylabe used in Example 1, 0.04 g of 1,2,4-tazole is used. Otherwise, the formulation of the silicone rubber composition, and the processing, remain unchanged.

COMPARATIVE EXAMPLE 9 (not according to the invention)

As described in Example 1, but in place of the octyl 1H-benzotriazole-5-carboxylate used in Example 1, 0.06 g of 4-amino-1,2,4-triazole is used. Otherwise, the formulation of the silicone rubber composition, and the processing, remain unchanged.

COMPARATIVE EXAMPLE 10 (not according to the invention)

As described in Example 1, but in place of the octyl 1H-benzotriazole-5-carboxylate used in Example 1, 0.06 g of 3-amino-1,2,4-triazole is used. Otherwise, the formulation of the silicone rubber composition, and the processing, remain unchanged.

EXAMPLE 11

220 parts by weight of a vinyldimethylsiloxy-terminated polydimethyl siloxane having a viscosity at 25° C. of 20 Pa·s are mixed with 40 parts by weight of hexamethyldisilazane, 15 parts by weight of deionized water and 140 parts by weight of pyrogenic silica having a BET specific surface area of 300 m²/g (Wacker®HDK T30 from Wacker-Chemie GmbH), which is added and mixed in little by little, in a sigma-type kneader, over a period of 1.5 hours at room temperature, to give a homogeneous mixture. In order to remove volatile constituents and byproducts, the mixture is then kneaded for 3 hours at 150° C. in vacuo (<100 mbar). Following this procedure, a further 200 parts by weight of the vinyl-functional polydimethylsiloxane are mixed in little by little, and the mixture is homogenized at room temperature over a period of 1 hour, giving a homogeneous starting composition which includes about 25% by weight of filler.

196.0 g of this starting composition are intimately mixed over a period of 5 minutes on a roll mill having a roll temperature of 25° C. with 0.1 g of ethynylcyclohexanol, 3.5 g of a copolymer which consists of dimethylsiloxy, methylhydrogensiloxy and trimethylsiloxy units, has 0.48% by weight of Si-bonded hydrogen, and which has a viscosity at 25° C. of 320 mPa·s, 0.05 g of octyl 1H-benzotriazo-5-carboxylate, and 0.2 g of a solution of a platinum-sym-divinyltetramethyldisiloxane complex in a dimethylvinylsiloxy-terminated polydimethylsiloxane, which has 1% by weight of platinum, based on elemental platinum, and has a viscosity at 25° C. of 1 Pa·s (catalyst OL from Wacker-Chemie GmbH). This mixture is then crosslinked in a hydraulic press at a temperature of 170° C. over a period of 5 minutes, giving a silicone-elastomer film. The demolded films, which have thicknesses of about 2 mm and 6 mm respectively, are not post-cured; they are characterized, without post-curing, with respect to compression set and other elastomeric properties.

COMPARATIVE EXAMPLE 12 (not according to the invention)

Corresponds to Example 11, but without addition of octyl 1H-benzotriazole-5-carboxylate.

EXAMPLE 13

As described in Example 11, except that the amount of vinyl-functional polydimethylsiloxane added after post-curing is reduced to 140 g. The filler content of the resultant starting composition is thereby increased to about 30% by weight.

COMPARATIVE EXAMPLE 14 (not according to the invention)

Corresponds to Example 13, but without addition of octyl 1H-benzotrizole-5-carboxylate.

EXAMPLE 15

As described in Example 11, with the exception that the amount of vinyl-functional polydimethylsiloxane added after the post-curing phase is reduced to 40 g. The filler content of the resultant starting composition is thereby increased to about 35% by weight.

COMPARATIVE EXAMPLE 16 (not according to the invention)

Corresponds to Example 15, but without addition of octyl 1H-benzotriazole-5-carboxylate.

EXAMPLE 17

100 g of each of the two components of an addition-crosslinking polydimethylsiloxane liquid rubber composition (Elastosil® LR 3003/40 from Wacker-Chemie GmbH) are intimately mixed with 0.04 g of octyl 1H-benzotriazole-5-carboxylate over a period of 5 minutes on a roll mill with a roll temperature of 25° C. This mixture is then crosslinked in a hydraulic press at a temperature of 170° C. over a period of 5 minutes, giving a silicone-elastomer film. The demolded films, which have thicknesses of about 2 mm and 6 mm respectively, are not post cured; they are characterized, without post-curing, with respect to compression set and other elastomeric properties.

COMPARATIVE EXAMPLE 18 (not according to the invention)

Corresponds to Example 17, but without addition of octyl 1H-benzotriazole-5-carboxylate.

EXAMPLE 19

Corresponds to Example 17, except that in place of the liquid silicone rubber composition Elastosil® LR 3003/40, type Elastosil® LR 3003/60 is used.

COMPARATIVE EXAMPLE 20 (not according to the invention)

Corresponds to Example 19, but without addition of octyl 1H-benzotriazole-5-carboxylate.

EXAMPLE 21

Corresponds to Example 17, except that in place of the liquid silicone rubber composition Elastosil® LR 3003/40, type Elastosil® LR 3003/70 is used.

COMPARATIVE EXAMPLE 22 (not according to the invention)

Corresponds to Example 21, but without addition of octyl 1H-benzotriazole-5-carboxylate.

Characterization of the silicone elastomer properties in Tables 1 to 4:

The novel and non-novel silicone elastomers prepared according to Examples 1 to 22 are evaluated on the basis of the following criteria:

a) Compression set (CS) according to DIN 53 517 using cylindrical test specimens of identical dimensions (diameter: 13 mm; height: 6 mm) under identical conditions (compression of 25% over 22 hours at 175° C.).

Table 1 shows the compression set values which result from the use of different triazole and benzotriazole compounds as described in Examples 1 to 10. Whereas the elastomers which include octyl 1H-benzotriazole-5-carboxylate as additive have very low compression set values, almost independently of the additive content, other triazoles and benzotriazoles can reduce the compression set only to an unsatisfactory extent, or (in particular when present in relatively high amounts) cause substantial disturbances in the crosslinking reaction, discernible by the change in Shore A hardness; in addition, the formation of streaks, fish-eyes and/or crystals greatly impairs the transparency of the elastomer. The significantly higher efficacy of octyl 1H-benzotriazole-5-carboxylate (M=275 g/mol) is to be emphasized, taking into account its molar mass, which is more than twice that of 1H-benzotriazole (M=119 g/mol).

b) Shore A according to DIN 53 505; tear resistance (TR) according to DIN 53 504-S1; elongation at break (EB) according to DIN 53 504-S1; tear propagation resistance (TPR) according to ASTM D624 B-73; rebound elasticity (RE) according to DIN 53 512-88.

The values for mechanical elastomer properties given in Table 2 confirm that octyl 1H-benzotriazole-5-carboxylate is highly effective in reducing compression set, almost independently of the filler content of the silicone elastomer; even at very high filler content, very low values of compression set are achieved without significantly impairing the other mechanical elastomer properties. In contrast, the efficacy of other triazoles and benzotriazoles, in particular of 1H-benzotriazole, in reducing compression set is generally associated with a disadvantageous change in the mechanical elastomer properties (Table 3). Table 4 shows that even very small proportions of octyl 1H-benzotriazole-5-carboxylate can bring about very low compression set values, independently of the type of the addition-crosslinking liquid silicone rubber and without altering the other mechanical elastomer properties. The drastic reduction in compression set which is achieved makes it unnecessary to carry out a subsequent post-curing of the silicone elastomers after the crosslinking reaction.

TABLE 1

Effect of triazole compounds and benzotriazole compounds on the compression set (CS), transparency and Shore A hardness of silicone elastomers

| Additive | | Proportion of additive [% by weight] | Transparency | CS [%] | Shore A |
|---|---|---|---|---|---|
| Comparative Example 2 | Without | — | | 60 | 50 |
| Example 1 | Octyl1H-benzotri-azole-5-carboxylate | 0.01 | No impairment | 13 | 51 |
| | | 0.02 | | 10 | 51 |
| | | 0.05 | | 10 | 51 |
| | | 0.10 | | 10 | 30 |
| Comparative Example 3 | 1H-Benzotri-azole | 0.01 | Microcrystals and streaks | 17 | 50 |
| | | 0.02 | | 13 | 50 |
| | | 0.05 | | 14 | 48 |
| | | 0.10 | | 26 | 42 |
| Comparative Example 4 | 1-Methyl-benzotri-azole | 0.05 | Fish-eyes, streaks | 49 | 51 |
| Comparative Example 5 | 1-Hydroxy-benzotri-azole | 0.05 | Needle-shaped crystals | 37 | 49 |
| Comparative Example 6 | 5-Methyl-benzotri-azole | 0.05 | Fish-eyes | 20 | 50 |
| Comparative Example 7 | 1H-1,2,3-Triazole | 0.02 | Transparent | 43 | 44 |
| | | 0.05 | | 69 | 37 |
| Comparative Example 8 | 1,2,4-Triazole | 0.02 | Fish-eyes | 16 | 48 |

TABLE 1-continued

Effect of triazole compounds and benzotriazole compounds on the compression set (CS), transparency and Shore A hardness of silicone elastomers

| Additive | | Proportion of additive [% by weight] | Transparency | CS [%] | Shore A |
|---|---|---|---|---|---|
| Comparative Example 9 | 4-Amino-1,2,4-triazole | 0.03 | Streaks | 18 | 51 |
| Comparative Example 10 | 3-Amino-1,2,4-Triazole | 0.03 | Fish-eyes | 21 | 50 |

TABLE 2

Effect of octyl 1H-benzotriazole-5-carboxylate (OBTC) on compression set (CS) and elastomer properties, with varying proportions of filler (PF) in the silicone elastomer

| | Proportion of OBTC | PF [% by weight] | Shore A | TR [N/mm$^2$] | EB [%] | TPR [N/mm] | RE [%] | CS [%] |
|---|---|---|---|---|---|---|---|---|
| Example 11 | 0.025% by weight | 25 | 43 | 6.1 | 540 | 18.0 | 66 | 14 |
| Example 12 | Without | 25 | 43 | 6.2 | 540 | 22.1 | 66 | 57 |
| Example 13 | 0.025% by weight | 30 | 47 | 8.5 | 600 | 25.4 | 61 | 14 |
| Example 14 | Without | 30 | 48 | 9.6 | 630 | 27.5 | 60 | 64 |
| Example 15 | 0.025% by weight | 35 | 52 | 8.7 | 590 | 35.2 | 55 | 16 |
| Example 16 | Without | 35 | 53 | 9.1 | 600 | 33.3 | 53 | 67 |

TABLE 3

Effect of octyl 1H-benzotriazole-5-carboxylate (OBTC) and 1H-benzotriazole (BT) on compression set (CS) and elastomer properties

| | Additive | Proportion [% by weight] | Shore A | TR [N/mm$^2$] | EB [%] | TPR [N/mm] | RE [%] | CS [%] |
|---|---|---|---|---|---|---|---|---|
| Example 2 | Without | — | 50 | 9.2 | 560 | 31 | 69 | 60 |
| Example 3 | BT | 0.01 | 50 | 7.4 | 490 | 26 | 69 | 17 |
| Example 3 | BT | 0.02 | 50 | 7.0 | 480 | 28 | 68 | 13 |
| Example 3 | BT | 0.05 | 48 | 6.1 | 450 | 29 | 65 | 14 |
| Example 3 | BT | 0.10 | 42 | 5.4 | 490 | 31 | 54 | 26 |
| Example 1 | OBTC | 0.01 | 51 | 9.1 | 550 | 31 | 64 | 13 |
| Example 1 | OBTC | 0.02 | 51 | 8.9 | 530 | 31 | 62 | 10 |
| Example 1 | OBTC | 0.05 | 51 | 9.1 | 550 | 31 | 63 | 10 |
| Example 1 | OBTC | 0.10 | 50 | 8.7 | 540 | 30 | 60 | 10 |

TABLE 4

Effect of octyl 1H-benzotriazole-5-carboxylate (OBTC) on compression set (CS) and elastomer properties of different liquid silicone elastomer types

| | Proportion of OBTC | Silicone elastomer types | Shore A | TR [N/mm$^2$] | EB [%] | TPR [N/mm] | RE [%] | CS [%] |
|---|---|---|---|---|---|---|---|---|
| Example 17 | 0.02% by weight | El LR 3003/40 | 41 | 9.8 | 690 | 23.4 | 59 | 11 |
| Example 18 | Without | El LR 3003/40 | 41 | 8.9 | 650 | 21.7 | 58 | 49 |
| Example 1 | 0.02% by weight | El LR 3003/50 | 51 | 9.1 | 550 | 26.9 | 66 | 10 |
| Example 2 | Without | El LR 3003/50 | 50 | 9.2 | 540 | 25.1 | 67 | 60 |
| Example 19 | 0.02% by weight | El LR 3003/60 | 59 | 10.6 | 500 | 32.7 | 68 | 13 |
| Example 20 | Without | El LR 3003/60 | 60 | 10.1 | 460 | 37.5 | 69 | 60 |
| Example 21 | 0.02% by weight | El LR 3003/70 | 68 | 10.1 | 390 | 34.8 | 67 | 15 |
| Example 22 | Without | El LR 3003/70 | 69 | 10.0 | 420 | 34.9 | 67 | 64 |

What is claimed is:

1. An addition crosslinkable silicone rubber composition comprising as constituents (I) alkenyl-functional polyorganosiloxane
   (II) SiH-functional crosslinker
   (III) hydrosilylation catalyst and
   (IV) at least one 1H-benzotriazole-5-carboxylic acid derivative selected from the group consisting of 1H-benzotriazole-5-carboxylic acid esters and 1H-benzotriazole-5-carboxylic acid amides.

2. A silicone rubber composition as claimed in claim 1, wherein the formulation of the alkenyl-containing polyorganosiloxane (I) has the formula $$R_a R^1_b SiO_{(4-a-b)/2} \quad (1),$$

in which

R is a identical or different monovalent $C_1$–$C_{10}$-hydrocarbon radical containing aliphatic carbon-carbon multiple bonds and is bonded to silicon, optionally via a bifunctional organic group, and is optionally halo- or cyano-substituted, $R^1$ is a identical or different monovalent SiC-bonded $C_1$–$C_{10}$-hydrocarbon radical having no aliphatic carbon-carbon multiple bonds and is optionally halo- or cyano-substituted, a is a non-negative number such that at least two radicals $R^1$ are present in every molecule, and b is a non-negative number such that (a+b) is in the range from 1.8 to 2.5.

3. A silicone rubber composition as claimed in claim 1, wherein the formutation of the SiH-functional crosslinker has the formula $$H_h R^6_i SiO_{(4-h-i)/2} \quad (5),$$

in which $R^6$ are as defined for $R^1$ and h and i are non-negative integers, with the proviso that 0.5<(h+i)<3.0 and 0<h<2, so that at least two hydrogen atoms bonded to silicon are present in each molecule.

4. A silicone rubber composition as claimed in claim 1, wherein the hydrosilylation catalysts (III) are selected from the group consisting of platinum, rhodium, palladium, ruthenium and iridium and their compounds.

5. A silicone rubber composition as claimed in claim 1, wherein the constituent (IV) is an ester and/or amide of 1H-benzotriazole-5-carboxylic acid which has the formula

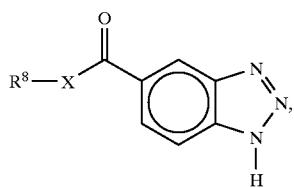

(8)

in which $R^8$ is a $C_2$–$C_{20}$-hydrocarbon radical which, optionally, may be halo- or cyano-substituted, or is an organosiloxane radical and X is a bivalent radical —O— or —NR$^{11}$—, where $R^{11}$ is H— or $R^8$.

6. A silicone rubber composition as claimed in claim 1, which includes from 0.005% to 1.0% by weight of an ester (IV) of 1H-benzotriazole-5-carboxylic acid.

7. Elastomeric articles prepared by crosslinking of the silicone rubber composition as claimed in claim 1.

* * * * *